United States Patent

Sugiyama et al.

[11] Patent Number: 6,017,141
[45] Date of Patent: Jan. 25, 2000

[54] VEHICLE LAMP AND VIBRATION TYPE WELDING METHOD FOR THE VEHICLE LAMP

[75] Inventors: Fujihiko Sugiyama; Shigeyuki Soga, both of Shizuoka, Japan

[73] Assignee: Koito Manufacturing Co., Ltd., Tokyo, Japan

[21] Appl. No.: 08/811,972

[22] Filed: Mar. 5, 1997

[30] Foreign Application Priority Data

Mar. 5, 1996 [JP] Japan .................................. 8-073132
Mar. 15, 1996 [JP] Japan .................................. 8-087575

[51] Int. Cl.[7] .................................................. F21Q 1/00
[52] U.S. Cl. ........................ 362/520; 362/521; 362/546; 362/310
[58] Field of Search ..................................... 362/546, 310, 362/287, 520, 521

[56] References Cited

U.S. PATENT DOCUMENTS

| 4,451,873 | 5/1984 | Tyler et al. ............................... 362/310 |
| 4,498,124 | 2/1985 | Mayer et al. ............................. 362/310 |
| 4,510,557 | 4/1985 | Tsuyama ................................... 362/310 |
| 4,544,998 | 10/1985 | Shanks .................................... 362/310 |
| 4,574,338 | 3/1986 | Takasaki et al. ......................... 362/521 |
| 4,654,760 | 3/1987 | Matheson et al. ....................... 362/546 |
| 4,675,792 | 6/1987 | Dorleans .................................. 362/546 |
| 4,855,877 | 8/1989 | Otaka ....................................... 362/520 |
| 4,868,725 | 9/1989 | Sakagawa et al. ....................... 362/521 |
| 5,050,048 | 9/1991 | Hendrischk et al. .................... 362/546 |
| 5,113,331 | 5/1992 | Nagengast ............................... 362/546 |
| 5,140,503 | 8/1992 | Lisak ....................................... 362/546 |
| 5,169,228 | 12/1992 | Breitzler ................................. 362/310 |
| 5,180,219 | 1/1993 | Geddie .................................... 362/546 |
| 5,735,596 | 4/1998 | Daumueller ............................. 362/546 |

OTHER PUBLICATIONS

"Assembly Engineering", Jun., 1979, p. 36.

*Primary Examiner*—Laura K. Tso
*Attorney, Agent, or Firm*—Sughrue, Mion, Zinn, Macpeak & Seas, PLLC

[57] ABSTRACT

The vehicle lamp has a lamp body with an opening. A flange extends around a peripheral portion of the opening and provides a joining surface. A front lens has a rear surface from which a leg projects. The leg of the front lens is wedged into the joining surface of the flange of the lamp body.

13 Claims, 6 Drawing Sheets

VEHICLE LAMP AND VIBRATION TYPE WELDING METHOD FOR THE VEHICLE LAMP

BACKGROUND OF THE INVENTION

This invention relates to a vehicle lamp in which the joining portion of a lamp body, which is used to form a vehicle lamp such as a vehicle sign lamp, is directly welded to the joining portion of a lens adapted to cover the opening of the lamp body, and more particularly to a vehicle lamp and its vibration type welding method in which the joining portions of the two components are partially molten by the frictional heat which is generated by electromagnetic vibration, and are then cooled so as to be welded together.

Figure 11:
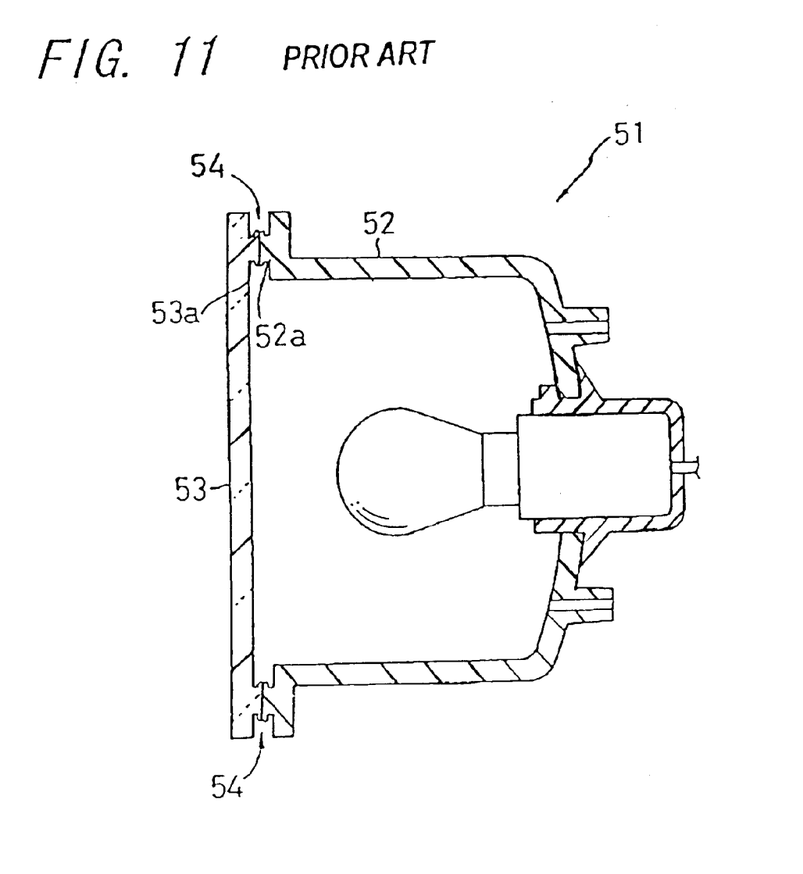
FIG. 11 is a sectional side view showing a conventional vehicle lamp which is formed according to a hot-plate type welding method.

A vehicle lamp is available which is formed by directly welding a joining portion of a lamp body of thermoplastic synthetic resin to a front lens of thermo-plastic synthetic resin. That is, a vehicle lamp is available which is formed by a so-called "hot-plate type welding method". The vehicle lamp 51 formed according to the method is generally shown in FIG. 11. As is seen from FIG. 11, the vehicle lamp 51 is advantageous in that the welding portion 54 of the lamp body 52 and the front lens 53 where those components are welded together is small in thickness, and therefore its effective area is large enough in the limited space of the vehicle body. The hot-plate type welding method is practiced as follows: A metal plate at a high temperature held between the welding portions 54 of workpieces, namely, the lamp body 52 and the front lens 53 which are to be welded together. That is, the welding portions of the workpieces, namely, the leg 52a of the lamp body 52 and the leg 53a of the front lens 53 are thermally deformed or thermally molten by heating the metal plate, so that they are welded together to form the vehicle lamp.

Figure 12:
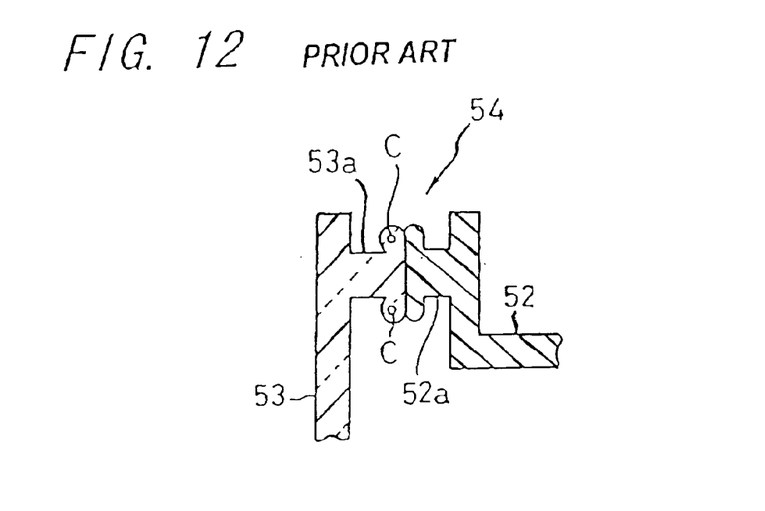
FIG. 12 is an enlarged sectional view showing the joining portions of a lamp body and a front lens which has been welded together according to the hot-plate type welding method.

However, the vehicle lamp 51 formed by the hot-plate type welding method is disadvantageous in the following points: As shown in FIG. 12, bubbles c, c, . . . are liable to be formed in the weld 54 which is formed by welding the leg 52a of the lamp body 52 and the leg 53a of the front lens together. Furthermore, since the weld 54 is relatively large, which impairs the external appearance of the vehicle lamp. In addition, the weld is formed by welding the ends of the legs 52a and 53a of the lamp body 52 and the front lens 53, and therefore the weld 54 is not only low in welding strength but also brittle. In the manufacture of the vehicle lamp, the heated metal plate is used, which increases the ambient temperature, thus worsening the environmental working condition and adversely affecting the performance of the peripheral equipment.

The vehicle lamp formed according to the hot-plate type welding method suffers from the following difficulty: As is seen from FIG. 11, when the vehicle is traveling in a rainy day, water drops striking the front lens 53 may flow over the side wall of the lamp body 52 to the back of the latter to enter the lamp chamber through ventilating pipes, or wets the electrical system of the vehicle lamp, resulting in the occurrence of a trouble therewith.

SUMMARY OF THE INVENTION

In view of the foregoing, an object of this invention is to provide a vehicle lamp and its vibration type welding method in which, in joining workpieces such as a lamp body and a lens, frictional heat is sufficiently generated between those workpieces, so that the welding portions of the workpieces are completely thermally deformed or molten, whereby those workpieces are firmly welded together.

Another object of the invention is to provide a vehicle lamp which is free from the above-described difficulty that water drops striking the front lens enters the lamp chamber through the ventilating pipes, or wets the electrical system of the vehicle lamp.

According to a first aspect of the invention, there is provided a vehicle lamp comprising: a first member made of synthetic resin having a first joining portion; and a second member made of synthetic resin having a second joining portion, wherein the first joining portion of the first member is welded to the second joining portion of the second member such that one of the first and second joining portions is wedged into the other joining portion.

According to a second aspect of the invention, there is provided a vehicle lamp comprising: a lamp body made of synthetic resin having an opening; a flange extending sidewards from a peripheral portion of the opening of the lamp body, and having a joining surface; a front lens made of synthetic resin; and a leg formed on a peripheral portion of a rear surface of the front lens, wherein the front lens is welded with the lamp body such that an end of the leg of the front lens is wedged into the joining surface of the flange of the lamp body, thus forming a weld of wedge type between the joining surface of the flange and the leg of the front lens.

According to a third aspect of the invention, there is provided a vehicle lamp comprising: a first lens made of synthetic resin having an opening; a flange extending sidewards from a peripheral portion of the opening of the first lens, and having a joining surface; a second lens made of synthetic resin; and a leg formed on a peripheral portion of a rear surface of the second lens, wherein the second lens is welded with the first lens such that an end of the leg of the second lens is wedged into the joining surface of the flange of the first lens, thus forming a weld of wedge type between the joining surface of the flange and the leg of the second lens.

According to a fourth aspect of the invention, there is provided the vehicle lamp according to the third aspect, wherein the first and second lenses are colored lenses which are different in color from each other.

According to a fifth aspect of the invention, there is provided a vehicle lamp vibration-type welding method comprising the steps of: (a) fitting a first workpiece having a joining portion in a lower receiving jig with the joining portion faced upwards; (b) securing the first workpiece such that the joining portion does not resonate in a direction of vibration; (c) laying a second workpiece having a joining portion on the first work piece such that the joining portion of the second workpiece is in abutment on the upper surface of the joining portion of the first workpiece; (d) moving the lower receiving jig upwardly until the first workpiece is pushed against the lower surface of a lower receiving jig, which is fixedly secured to the lower end of a vibration generating device, under a predetermined pressure; and (e) vibrating the upper receiving jig in a direction perpendicular to the direction of application of the predetermined pressure, to generate frictional heat at the contact region of the first and second workpieces, thereby to weld the joining portions of the first and second workpieces together.

According to a sixth aspect, there is provided the method according to the fifth aspect, wherein the first workpiece is a lens with a leg, while the second work piece is a lamp body with a flange, the peripheral portion of an opening of the lamp body is fixedly laid on the lower receiving jig while being secured such that the peripheral portion of the opening does not resonate in a direction of vibration, the end of the leg of the lens is laid abutted against the upper surface of the flange of the lamp body, thereafter, the lower receiving jig is moved upwardly until the surface of the lens is pushed against the lower surface of the upper receiving jig secured to the lower end of the vibration generating device, to apply a predetermined pressure to the contact region of the upper surface of the flange of the lamp body and the leg of the lens, and under this condition, the upper receiving jig is vibrated in a direction perpendicular to the direction of application of the predetermined pressure.

According to a seventh aspect of the invention, there is provided the method according to the fifth aspect, wherein the first workpiece is a first lens, and the second workpiece is a second lens different in color from the first lens.

According to a eighth aspect of the invention, there is provided the method according to the sixth aspect, wherein a draining rib formed along the outer periphery of the flange of the lamp body, which is the first workpiece, is fixedly fitted in a fitting groove formed in the lower receiving jig, thereby to prevent the resonance of the peripheral portion of the opening of the lamp body when the upper receiving jig is vibrated.

According to a ninth aspect of the invention, there is provided a vehicle lamp comprising: a lamp body made of synthetic resin having an opening; a flange extending sidewards from a peripheral portion of the opening of the lamp body, and having a joining surface; a front lens made of synthetic resin; a leg formed on a peripheral portion of a rear surface of the front lens; and a draining rib extending from an outer peripheral portion of the flange of the lamp body such that the draining rib is folded towards the rear wall of the lamp body.

According to a tenth aspect of the invention, there is provided the vehicle lamp according to the ninth aspect, wherein the end portion of the draining rib is acute in sectional angle.

According to an eleventh aspect of the invention, there is provided the vehicle lamp according to one of the ninth and tenth aspects, wherein the draining rib is formed only on the lower part of the vehicle lamp.

In the vehicle lamp of the invention, the first and second members of synthetic resin, which form the vehicle lamp, are welded to each other in such a manner that the end of the joining portion of the second member is wedged into the joining portion of the first member, so that the joining portions of the first and second members are firmly welded together; that is, the front lens is firmly welded to the lamp body. In addition, the joining portions of the lenses is reduced in volume; that is, the joining portion of two lenses different in color can be made small.

In the vibration-type welding method of the invention, while a suitable pressure is being applied to the joining portions of the lamp body and the lens (the workpieces), the lens is vibrated to locally generate frictional heat. Hence, the peripheral portion of the opening (the end of the leg) cuts into the peripheral portion of the opening (the upper surface of the flange) of the lamp body or another lens which is a thermally deformed or molten workpiece on the stationary side; that is, the joining portions of the former and the latter are welded together in such a manner the joining portion of the former is wedged into the joining portion of the latter.

The welding method of the invention is applicable to the manufacture of a vehicle lamp whose lamp body is deep. That is, in the method, the draining rib is fitted in the groove of the lower receiving jig so that the side wall of the lamp body may not resonate with the vibration of the lens. Hence, when the lens is vibrated, the peripheral portion of the opening of the lamp body is held completely at rest, so that the frictional heat is generated sufficiently; that is, the joining portions of the workpieces is positively welded together.

With the vehicle lamp thus designed, the draining rib which is provided by folding the outer peripheral portion of the flange of the lamp body shakes off water drops which, when the vehicle is traveling in a rainy day, flows over the side wall of the lamp body to the rear wall of the latter; that is, it is able to prevent water drops from entering into the lamp chamber through the ventilating pipe formed in the rear wall of the lamp body or from wetting the electrical system of the vehicle lamp.

Especially, in the case of the vehicle lamp whose draining rib is protruded backwardly of the lamp body, the performance of the draining rib is improved that, when the vehicle is traveling in a rainy day, it shakes off water drops which, striking the front lens 3, flows over the side wall of the lamp body 2 to the rear wall of the latter.

In the case of a vehicle lamp in which, instead of two ventilating pipes, only one ventilating pipe is provided on the lower portion of the rear wall of the lamp body, the draining rib may be formed only on the lower part of the flange of the lamp body to prevent the entrance of water drops into the ventilating pipe.

BRIEF DESCRIPTION OF THE DRAWINGS

FIG. 1 shows an example of a vehicle lamp, which constitutes a first embodiment of the invention. More specifically.

FIG. 6 shows another example of the vehicle lamp, which constitutes a second embodiment of the invention. More specifically.

DETAILED DESCRIPTION OF THE PREFERRED EMBODIMENTS

Preferred embodiments of the invention will be described with reference to the accompanying drawings.

Figure 1:
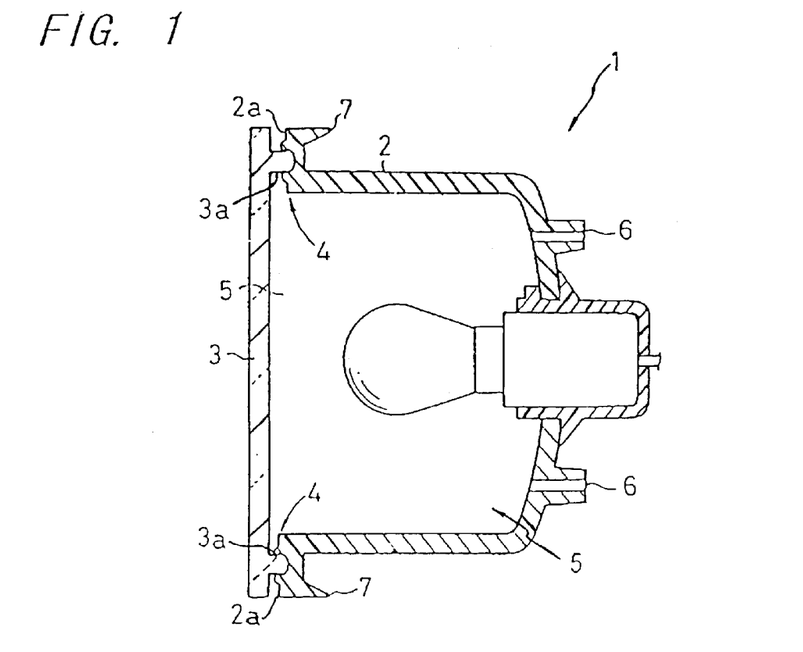
FIG. 1 is a sectional view of the vehicle lamp which has a draining rib around the lamp body.

FIG. 1 shows an example of a vehicle lamp, which constitutes a first embodiment of the invention.

The vehicle lamp 1 according to the invention is formed by directly welding the front end of the leg (or joining portion) 3a which is formed on the periphery of the rear surface of a front lens (or a member) 3 of thermoplastic synthetic resin to a flange (or joining portion) 2a which is radially outwardly extended from the edge of the opening of a lamp body (or a member) 2 which is also of thermo-plastic synthetic resin. The weld 4 of the lamp body 2 and the front lens 3 is small in thickness, and therefore its effective area is large enough in the limited space of the vehicle body. Ventilating holes 6 and 6 are extended backwardly from the back of the lamp body 2 to communicate the inside and the outside of the lamp chamber 5 with each other, thereby to prevent the lamp chamber 5 from being misted.

A draining rib 7 extends backwardly from the outer edge of the flange 2a of the lamp body 2. The draining rib 7 function as follows: That is, when the vehicle is traveling in a rainy day, the draining rib 7 shakes off water drops which otherwise, striking the front lens 3, flows over the side wall of the lamp body to the rear wall to enter the lamp chamber 5. In order to improve the function of the draining rib 7, it is preferable that the end portion of the draining rib 7 is acute in sectional angle.

Figure 2:
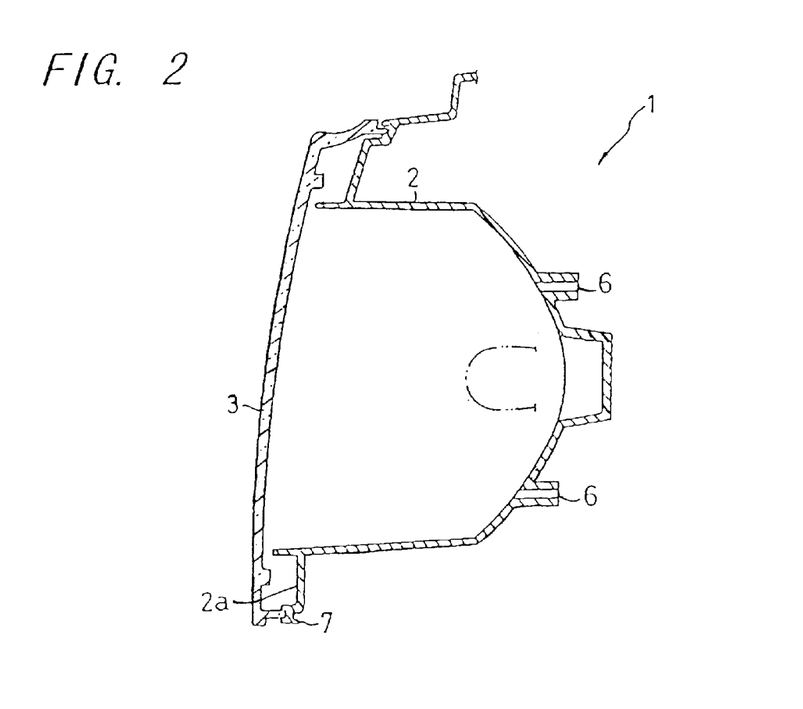
FIG. 2 shows another example of the vehicle lamp according to the invention, in which a draining rib is formed only on the lower wall of the lamp body.

Depending on the configuration of the vehicle lamp, the draining rib 7 may be formed only on the lower edge of the flange 2a of the lamp body 2 as shown in FIG. 2. For instance in the case of a vehicle lamp 1 in which the peripheral of the opening of the lamp body 2, being large, is folded back, water drops striking the front lens 3 will never flow into the ventilation holes 6. In the vehicle lamp of this type, it is unnecessary to form the draining rib 7 on the upper wall of the vehicle lamp 1.

Figure 3:
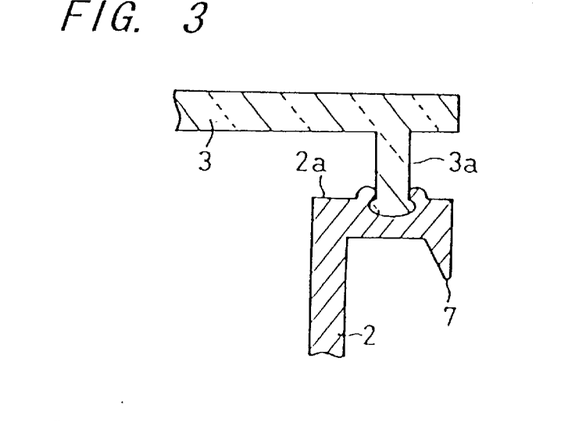
FIGS. 3, 4 and 5 are enlarged sectional views showing examples of a joining region of the peripheral portion of the opening of the lamp body and the peripheral portion of the opening of the front lens.
Figure 4:
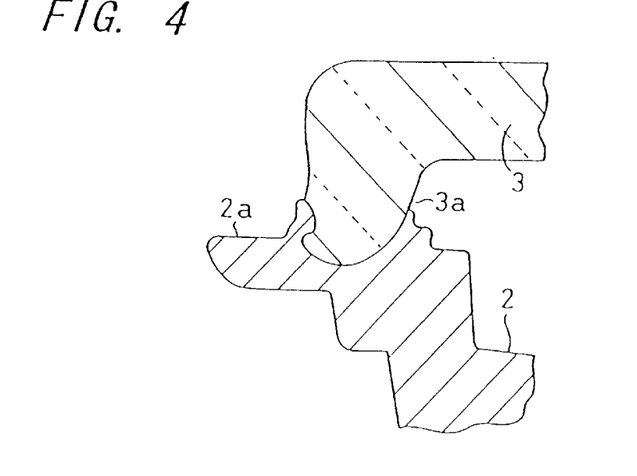
Figure 5:
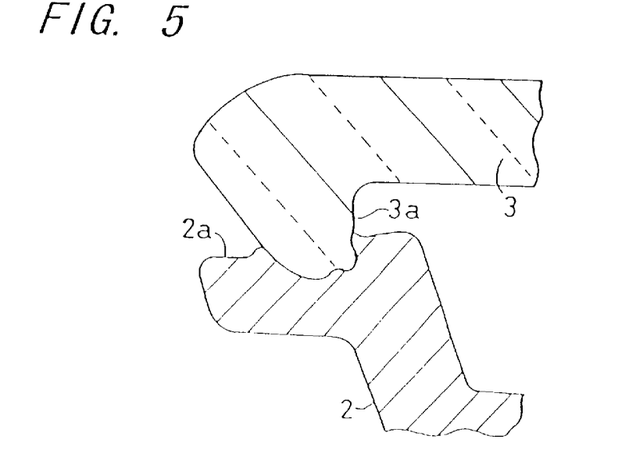

FIGS. 3 through 5 show welding portions of the vehicle lamp according to the invention.

In the vehicle lamp 1 of the invention, the end portion of the leg 3a which is formed on the outer periphery of the front lens 3 wedges into the flange 2a of the lamp body 2. More specifically, the end portion of the leg 3a is surrounded by the molten material of the flange 2a, so that the leg and the flange are firmly joined together. In order to wedge the end portion of the leg 3a into the upper surface of the flange 2a, a vibration type welding method (described later) is employed.

In the above-described embodiment, the front lens 3 is of acrylic synthetic resin, while the lamp body 2 is of synthetic resin such as ABS and AAS. That is, in the combination of the above-described synthetic resin materials, it is preferable that the resin material of one of the workpieces, namely, the front lens 3 is higher in thermal deforming temperature and thermal melting temperature than that of the other workpiece, namely, the lamp body 2. With the combination of those resin materials, the material of one of the workpiece W (the front lens 3 in the embodiment) wedges into the material of the other workpiece W (the lamp body 2 in the embodiment), so that the two workpieces W are firmly joined together. That is, during the welding operation, the weld of wedge-type is formed. When the weld is cooled and solidified, the two workpieces are strongly joined to each other.

Figure 6:
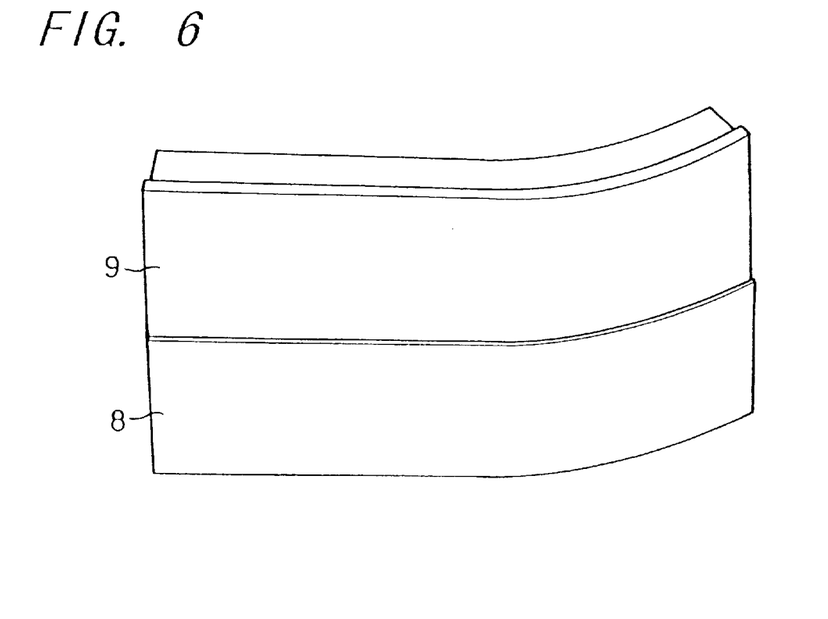
FIG. 6 is a perspective view showing a two-tone color lens which is formed by welding the edges of first and second lenses together which are different in color from each other.

FIG. 6 shows another example of the vehicle lamp, which constitutes a second embodiment of the invention.

Figure 7:
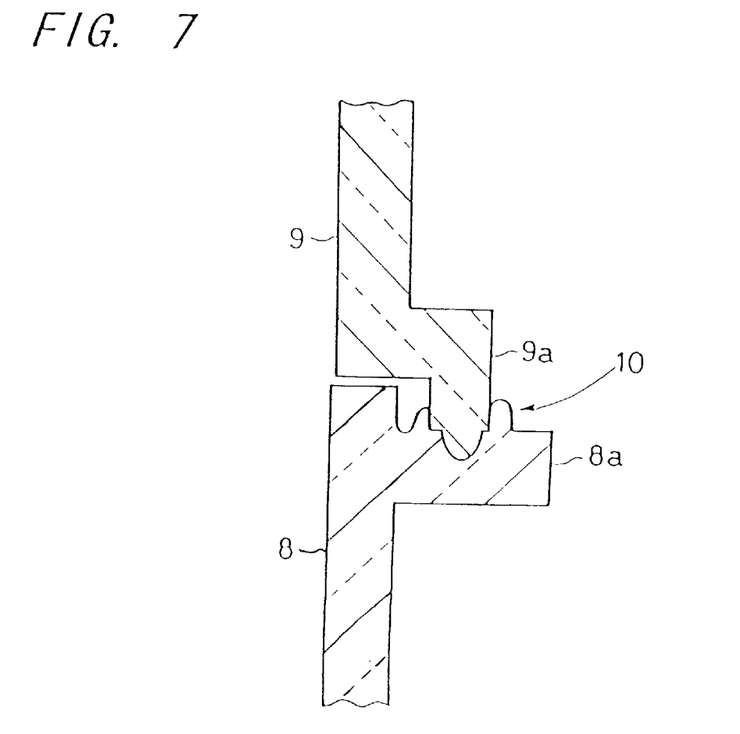
FIG. 7 is a sectional view showing the joining region of the first and second lenses different in color.

In the first embodiment, the vehicle lamp 1 is formed by welding the front lens 3 of synthetic resin to the lamp body which is also of synthetic resin. However, in a vehicle lamp, its front lens may be made up of first and second lenses 8 and 9 different in color, or its lamp body may be made up of plurality of parts different in color. That is, in the vehicle lamp 1, the second embodiment, a flange 8a extends outwardly (backwardly of the vehicle lamp 1 in the embodiment, or to the right in FIG. 7) from one edge of one side of a first lens 8 which is of synthetic resin and red in color, and the end of a leg 9a, which is formed on the periphery of the rear surface of a second lens 9 which is amber in color, is welded to the aforementioned flange 8a, in such a manner that the end portion of the second lens 9 is wedged into the joining surface of the flange 8a of the first lens, thus forming a weld of wedge-type between the joining surface of the flange 8a and the end portion of the second lens 9. The weld 10 thus formed, being covered by the dark red color of the first lens 8, does not adversely affect the external appearance of the resultant vehicle lamp. A vibration type welding method (described later) may be applied to the case where the first and second lenses 8 and 9 are joined together in the above-described manner.

Figure 8:
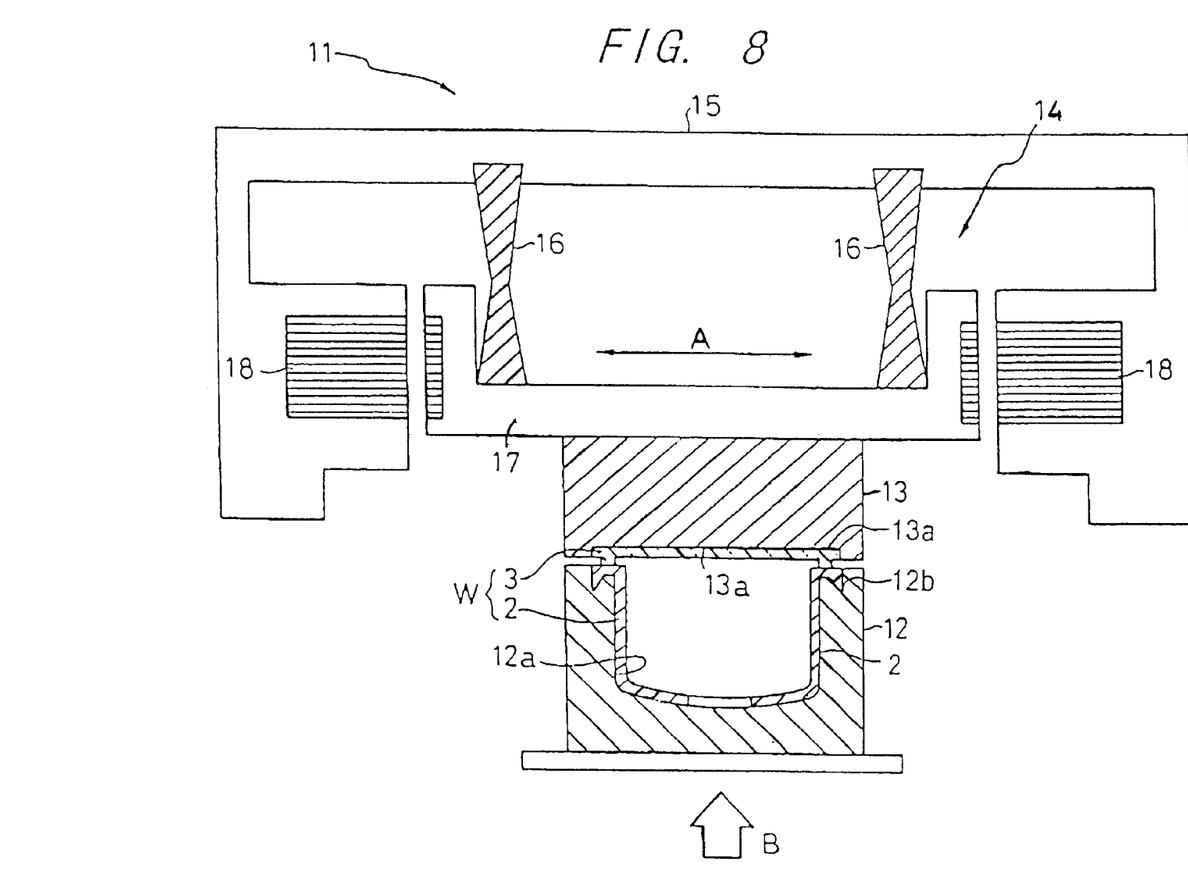
FIG. 8 is an explanatory diagram for a description of the principle of a welding device which practices a vibration-type welding method according to the invention.

FIG. 8 shows a welding apparatus for practicing the aforementioned vibration type welding method according to the invention.

Roughly stated, the welding apparatus 11 generates frictional heat between the welding portions of workpieces W by electromagnetic vibration, to melt the materials of the welding portions, and then solidifies the latter by cooling, thereby to join the workpieces W together. The welding apparatus 11 comprises: a lower receiving jig 12 (on the stationary side) in the upper surface of which a recess 12a is formed in which a lamp body 2 is fitted; an upper receiving jig 13 (on the movable side) in the lower surface of which a recess 13a is formed in which a front lens 3 is fitted; and a vibration generating device 14 for electro-magnetically vibrating the upper receiving jig 13.

In the vibration generating device 14, a vibrator 17 is suspended through high-rigidity elastic members 16 and 16 from the lower surface of a top board 15 in such a manner that the vibrator 17 is movable horizontally (right and left). Further-more, electromagnets 18 and 18 are set on both sides of the vibrator 17; that is, they are confronted with each other through the vibrator 17. And the upper receiving jig 13 is fixedly secured to the lower surface of the vibrator 17. Hence, as the right and left electro-magnets 18 and 18 are energized alternately, the vibrator 17 is attracted by the right and left electro-magnets alternately; that is, the vibrator 17 is vibrated horizontally (in the directions of the two-head arrow A), so that the upper receiving jig 13 is vibrated together with the vibrator 17. In the embodiment, the electro-magnetic vibration of the vibrator 17 is a horizontal vibration whose frequency is of the order of 240 Hz. The electro-magnetic vibration generating method is not always limited to that which has been described above. That is, it will be obvious to those skilled in the art that various changes and modifications may be made therein without departing from the invention.

Figure 9:
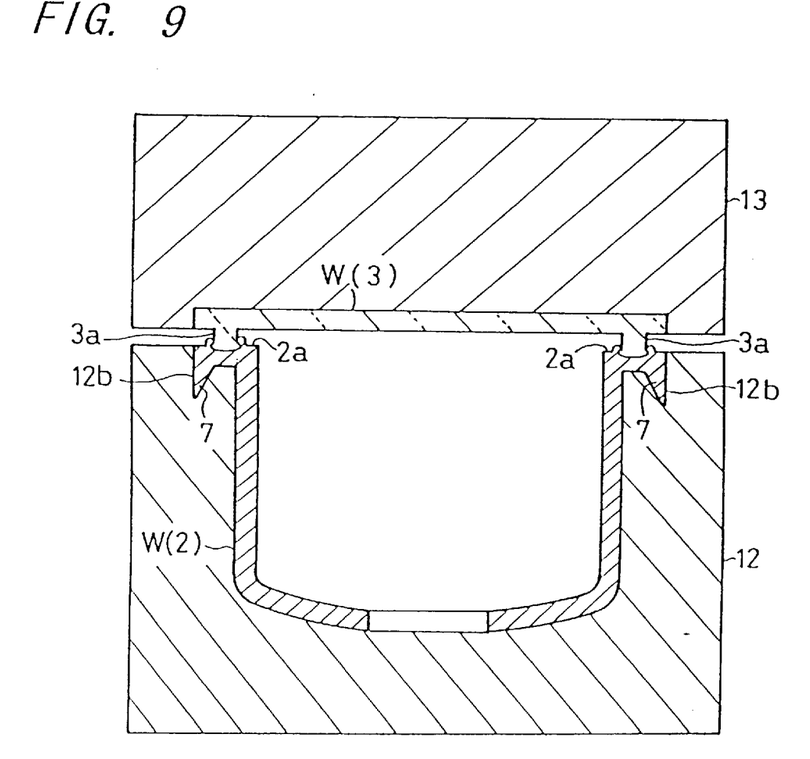
FIG. 9 is an enlarged sectional view showing a lower receiving jig and an upper receiving jig in the welding apparatus.

With the apparatus thus organized, a lamp body 2 (the second workpiece) is fitted in the recess 12a formed in the upper surface of the lower receiving jig 12, while the draining rib 7 formed along the periphery of the flange 2a is fitted in a groove 12b formed in the lower receiving jig 12, and a front lens 3 (the first workpiece) is fixedly set in the recess 13a formed in the lower surface of the upper receiving jig 13. Under this condition, the lower receiving jig 12 is moved upwardly (in the direction of the arrow B) with a suitable lifting means (not shown) until the workpieces (the lamp body 2 and the front lens 3) are held between the lower receiving jig 12 and the upper receiving jig 13; that is, the joining portions of the two workpieces W are brought into contact with each other under pressure; more specifically, the end of the leg 3a of the front lens 3 is brought into contact with the upper surface of the flange 2a of the lamp body 2 under pressure. Under this condition, the above-described vibration generating device 11 is activated to generate electromagnetic vibration with an amplitude of about 1 to 1.2 mm, to vibrate the upper receiving jig in a direction perpendicular to the direction of application of the pressure, so that frictional heat is generated locally at the joining surfaces of the workpieces W.

According to the vibration type welding method of the invention, a welding operation can be achieved with the vibration which is small about 240 Hz in frequency and 1 to 1.2 mm in amplitude. Hence, with respect to the configuration of a product, the manufacturing limitation is less. Hence, with the method, a variety of workpieces can be welded. For instance, even in the case where the leg 3a (the joining portion) of the front lens 3 is short, or in the case where the leg 3a of the front lens 3 is bent about 90° with respect to the joining portion of the lamp body 2, or in the case where the welding line is of a simple tertiary curved surface, the welding operation can be satisfactorily achieved at all times.

In order to practice the vibration type welding method of the invention, the lamp body 2 should have the draining ribs 7 at least at the parts of the periphery of the flange 2a which are confronted with each other as viewed in the direction of vibration of the front lens 3.

The materials of the joining portions of the two workpieces W are thermally deformed or molten by the frictional heat, and the end portion of the leg 3a of the front lens 3 (one of the two workpieces) is wedged into the surface of the flange 2a of the lamp body 2a (the other workpiece), while the end portion of the leg 3 is surrounded by the molten material of the flange 2a of the lamp body. Under this condition, the electromagnetic vibration is suspended, and the weld of the workpieces is solidified by cooling while the workpieces are kept under pressure. As a result, the joining portions of the two workpieces are formed into a weld of wedge-type; that is, the end of the leg 3a of the front lens 3 is strongly welded to the surface of the flange 2a of the lamp body 2 (cf. FIGS. 3 through 5).

In the above-described embodiment, the lower receiving jig 12 is so shaped that the lamp body 2 is fitted in its recess 12a, and the draining rib 7 formed by folding over the outer periphery of the flange 2a of the lamp body 2 is fitted in the groove 12b formed around the aforementioned recess 12a, so that the side wall of the lamp body 2 is fixed, not resonating. Hence, the frictional heat is positively generated.

In the vibration type welding method shown in FIGS. 8 and 9, the leg 3a of the front lens 3 is brought into contact with the surface of the flange 2a of the lamp body 2 under pressure, and the frictional heat is generated by vibration. Therefore, as long as the leg 3a vibrates to rub the surface of the flange 2a, the surface of the front lens (one of the workpieces) may be convex. That is, in the method of the invention, the surface of the front lens 3 is not always limited to a flat one.

Figure 10A:
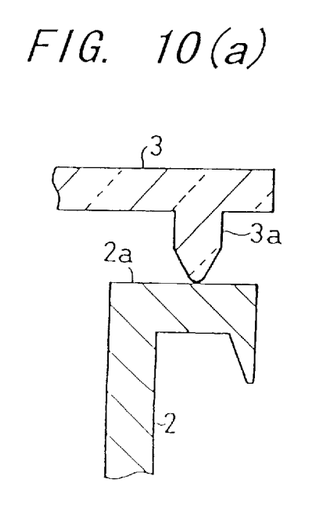
FIGS. 10(a) and 10(b) are sectional views showing other examples of the leg of the front lens. More specifically, FIG. 10(a), the end portion of the leg is substantially conical, and FIG. 10(b), it is substantially semi-spherical.
Figure 10B:
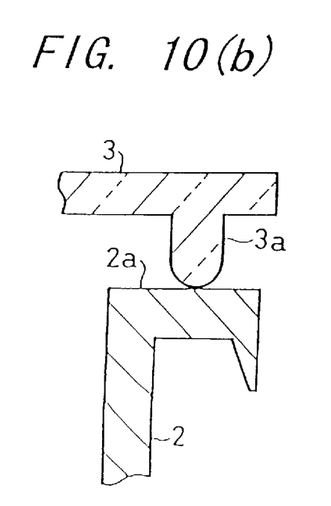

FIG. 10 is for a description of another embodiment of the invention, showing examples of the leg of the front lens.

That is, the leg 3a of the front lens 3 is brought into contact with the joining portion of the flange 2a of the lamp body 2 under pressure, generating frictional heat. As a result, the end portion of the leg 3 is thermally molten and welded to the joining portion of the lamp body 2. Hence, if the end portion of the leg 3a is extremely acute in angle, then when the leg 3a is initially brought into contact with the joining portion of the flange 2a of the lamp body 2 under pressure, the end portion of the leg 3a cuts into the surface of the flange 2a which makes it difficult to vibrate the leg. Therefore, as shown in FIGS. 10(a) and 10(b), the end portion of the leg 3a is so shaped that it is conical with the tip rounded or it has a semi-spherical tip, whereby the leg 3a is smoothly vibrated on the surface of the flange 2a of the lamp body 2.

The vehicle lamp of the invention is designed as described above. Hence, in the manufacture, the joining portions of the lamp body and the front lens are positively welded together with the end portion of the leg of the front lens wedged into the surface of the flange of the lamp body Furthermore, even in the welding of two lenses, the joining portion of one of the two lenses is wedged into the joining portion of the other lens; that is, the lenses are firmly welded together.

The vibration-type welding method of the invention is applicable to a vehicle lamp whose lamp body is deep. That is, the method is so developed that, when the front lens, which is a workpiece on the movable side, is vibrated, the side wall of the lamp body, which is a workpiece on the stationary side, may not resonate with the vibration of the front lens. Hence, sufficiently high frictional heat can be generated at the joining portions of the two workpieces, and the workpieces are welded together in such a manner that the end portion of the leg of the front lens is wedged into the surface of the flange of the lamp body.

The welding apparatus for practicing the vibration-type welding method of the invention is simple in structure, and positive in operation. When compared with the conventional vehicle lamp which is formed by the hot-plate type welding method or ultrasonic welding method, the vehicle lamp according to the invention is fine in appearance and short in manufacturing time. Those effects should be highly appreciated in practical use.

In order to practice the vibration type welding method of the invention, the lamp body has the draining ribs at least at the part of the periphery of the flange as viewed in the direction of vibration of the front lens.

With the vehicle lamp thus designed, the draining rib provided by folding the outer peripheral portion of the flange of the lamp body shakes off water drops which, when the vehicle is traveling in a rainy day, flows over the side wall of the lamp body to the rear wall of the latter; that is, it is able to prevent water drops from entering the lamp chamber through the ventilating pipe formed in the rear wall of the lamp body.

In addition, the draining rib is fitted in the groove formed around the recess of the lower receiving jig when the vehicle lamp is formed according to the vibration-type welding method. Hence, even if the lamp chamber is deep, the side wall of the lamp body can be firmly held. Hence, during the manufacture, the lamp body will never resonate with the vibration of the leg of the front lens, and therefore the frictional heat is positively generated, whereby the front lens is firmly welded to the lamp body. Those effects or merits of the invention should be highly appreciated in practical use.

What is claimed is:

1. A vehicle lamp comprising:
   a first member made of synthetic resin having a first joining portion; and
   a second member made of synthetic resin having a second joining portion, wherein the first joining portion of the first member is welded to the second joining portion of the second member such that one of the first and second joining portions is wedged into the surface of the other joining portion.

2. A vehicle lamp comprising:

a lamp body made of synthetic resin having an opening and a rear wall;

a flange extending from a peripheral portion of the opening of the lamp body, and having a joining surface;

a front lens made of synthetic resin; and a leg formed on a peripheral portion of a rear surface of the front lens;

wherein the front lens is welded with the lamp body such that an end of the leg of the front lens is wedged into the joining surface of the flange of the lamp body, thus forming a wedge-shaped weld.

3. The vehicle lamp according to claim 2, wherein the end of the leg has a conical shape with a tip rounded.

4. The vehicle lamp according to claim 2, wherein the end of the leg has a semi-spherical tip.

5. A vehicle lens comprising:

a first lens made of synthetic resin;

a flange extending from a side peripheral portion of the first lens, and having a joining surface;

a second lens made of synthetic resin; and a leg formed on a peripheral portion of a rear surface of the second lens, wherein the second lens is welded with the first lens such that an end of the leg of the second lens is wedged into the joining surface of the flange of the first lens, thus forming a wedge-shaped weld between the joining surface of the flange and the leg of the second lens.

6. The vehicle lamp according to claim 5, wherein the first and second lenses are colored lenses which are different in color from each other.

7. The vehicle lamp according to one of claims 2 to 4, further comprising:

a draining rib extending from an outer peripheral portion of the flange of the lamp body such that the draining rib is folded towards the rear wall of the lamp body.

8. The vehicle lamp according to claim 7, wherein an end portion of the draining rib is acute in sectional angle.

9. The vehicle lamp according to claim 7, wherein the draining rib is formed only on a lower part of the vehicle lamp.

10. A vehicle lamp comprising:

a lamp body made of synthetic resin, and having an opening and a rear wall;

a flange extending from a peripheral portion of the opening of the lamp body, and having a joining surface;

a front lens made of synthetic resin;

a leg formed on a peripheral portion of a rear surface of the front lens, the leg being wedged into the joining surface of the flange; and a draining rib extending from an outer peripheral portion of the flange of the lamp body such that the draining rib is folded towards the rear wall of the lamp body.

11. The vehicle lamp according to claim 10, wherein the end portion of the draining rib is acute in sectional angle.

12. The vehicle lamp according to one of claims 10 and 11, wherein the draining rib is formed only on the lower part of the vehicle lamp.

13. The vehicle lamp according to claim 8, wherein the draining rib is formed only on a lower part of the vehicle lamp.

* * * * *